(12) United States Patent
Jaramillo et al.

(10) Patent No.: US 11,394,035 B2
(45) Date of Patent: Jul. 19, 2022

(54) REFUELABLE BATTERY FOR THE ELECTRIC GRID AND METHOD OF USING THEREOF

(71) Applicant: FORM ENERGY INC., Somerville, MA (US)

(72) Inventors: Mateo Cristian Jaramillo, San Francisco, CA (US); Ian Salmon McKay, Seattle, WA (US); William Henry Woodford, Cambridge, MA (US)

(73) Assignee: FORM ENERGY, INC., Somerville, MA (US)

( * ) Notice: Subject to any disclaimer, the term of this patent is extended or adjusted under 35 U.S.C. 154(b) by 5 days.

(21) Appl. No.: 16/500,906

(22) PCT Filed: Apr. 5, 2018

(86) PCT No.: PCT/US2018/026243
§ 371 (c)(1),
(2) Date: Oct. 4, 2019

(87) PCT Pub. No.: WO2018/187561
PCT Pub. Date: Oct. 11, 2018

(65) Prior Publication Data
US 2020/0136153 A1 Apr. 30, 2020

Related U.S. Application Data

(60) Provisional application No. 62/482,639, filed on Apr. 6, 2017.

(51) Int. Cl.
*H01M 6/50* (2006.01)
*H01M 6/52* (2006.01)
*H01M 50/70* (2021.01)

(52) U.S. Cl.
CPC ........... *H01M 6/5077* (2013.01); *H01M 6/52* (2013.01); *H01M 50/70* (2021.01)

(58) Field of Classification Search
CPC ....... H01M 6/5077; H01M 6/52; H01M 50/70
See application file for complete search history.

(56) References Cited

U.S. PATENT DOCUMENTS

| | | | |
|---|---|---|---|
| 2,643,276 A | 6/1953 | Salauze | |
| 2,683,182 A | 7/1954 | Salauze | |
| (Continued) | | | |

FOREIGN PATENT DOCUMENTS

| | | |
|---|---|---|
| CN | 206340592 U | 7/2017 |
| CN | 109478653 A | 3/2019 |
| (Continued) | | |

OTHER PUBLICATIONS

Machine translation of WO 2015/145690 (no date).*
(Continued)

*Primary Examiner* — Amanda C. Walke
(74) *Attorney, Agent, or Firm* — The Marbury Law Group PLLC

(57) ABSTRACT

Systems and methods of the various embodiments may provide a refuelable battery for the power grid to provide a sustainable, cost-effective, and/or operationally efficient solution to energy source variability and/or energy demand variability. In particular, the systems and methods of the various embodiments may provide a refuelable primary battery solution that addresses bulk seasonal energy storage needs, variable demand needs, and other challenges.

11 Claims, 8 Drawing Sheets

(56) References Cited

U.S. PATENT DOCUMENTS

| | | |
|---|---|---|
| 3,484,291 A | 12/1969 | MacKenzie et al. |
| 3,847,603 A | 11/1974 | Fukuda et al. |
| 3,947,292 A | 3/1976 | Jackovitz et al. |
| 4,168,349 A | 9/1979 | Buzzelli |
| 4,246,324 A | 1/1981 | de Nora et al. |
| 4,250,236 A | 2/1981 | Haschka et al. |
| 4,384,928 A | 5/1983 | Hall |
| 4,444,858 A * | 4/1984 | Nishibu .......... G03G 13/283 101/465 |
| 4,448,858 A | 5/1984 | Graf et al. |
| 4,450,211 A | 5/1984 | Vignaud |
| 4,485,154 A | 11/1984 | Remick et al. |
| 4,552,630 A | 11/1985 | Wheeler et al. |
| 4,828,942 A | 5/1989 | Licht |
| 4,842,963 A | 6/1989 | Ross, Jr. |
| 4,977,044 A | 12/1990 | Ludwig |
| 5,011,747 A | 4/1991 | Strong et al. |
| 5,145,752 A | 9/1992 | Goldstein et al. |
| 5,190,833 A | 3/1993 | Goldstein et al. |
| 5,397,532 A | 3/1995 | Blaimschein |
| 5,411,815 A | 5/1995 | Goldstein |
| 5,415,949 A | 5/1995 | Stone et al. |
| 5,432,022 A | 7/1995 | Cheiky |
| 5,441,820 A | 8/1995 | Siu et al. |
| 5,451,475 A | 9/1995 | Ohta et al. |
| 5,549,991 A | 8/1996 | Licht et al. |
| 5,569,551 A | 10/1996 | Pedicini et al. |
| 5,595,949 A | 1/1997 | Goldstein et al. |
| 5,665,481 A | 9/1997 | Schuster et al. |
| 5,700,596 A | 12/1997 | Ikoma et al. |
| 5,788,943 A | 8/1998 | Aladjov |
| 6,194,098 B1 | 2/2001 | Ying et al. |
| 6,210,832 B1 | 4/2001 | Visco et al. |
| 6,228,535 B1 | 5/2001 | Fierro et al. |
| 6,249,940 B1 | 6/2001 | Asano et al. |
| 6,268,085 B1 | 7/2001 | Manthiram et al. |
| 6,358,643 B1 | 3/2002 | Katz et al. |
| 6,416,649 B1 | 7/2002 | Ray et al. |
| 6,458,480 B1 | 10/2002 | Morris et al. |
| 6,475,658 B1 | 11/2002 | Pedicini et al. |
| 6,537,701 B1 | 3/2003 | Nimon et al. |
| 6,849,172 B2 | 2/2005 | Rigby et al. |
| 6,849,356 B2 | 2/2005 | Dow et al. |
| 7,060,388 B2 | 6/2006 | Naruoka |
| 7,070,632 B1 | 7/2006 | Visco et al. |
| 8,329,346 B2 | 12/2012 | Janse Van Rensburg et al. |
| 8,397,508 B2 | 3/2013 | Weimer et al. |
| 8,758,948 B2 | 6/2014 | Narayan et al. |
| 9,065,120 B2 | 6/2015 | Carlson |
| 9,172,123 B2 | 10/2015 | Albertus et al. |
| 9,368,486 B2 | 6/2016 | Licht |
| 9,368,788 B2 | 6/2016 | Ogg et al. |
| 9,419,273 B2 | 8/2016 | Kakeya et al. |
| 9,478,806 B2 | 10/2016 | Ogg et al. |
| 9,537,144 B2 | 1/2017 | Huang et al. |
| 9,559,385 B2 | 1/2017 | Ogg et al. |
| 9,577,298 B2 | 2/2017 | Narayan et al. |
| 9,583,779 B2 | 2/2017 | Chiang et al. |
| 9,660,265 B2 | 5/2017 | Visco et al. |
| 9,680,151 B2 | 6/2017 | Mullins |
| 9,680,154 B2 | 6/2017 | Chen et al. |
| 9,780,379 B2 | 10/2017 | Zhamu et al. |
| 9,843,064 B2 | 12/2017 | Brandon et al. |
| 9,893,397 B2 | 2/2018 | Yoshida et al. |
| 9,911,985 B2 | 3/2018 | Dong et al. |
| 9,947,481 B2 | 4/2018 | Solomon et al. |
| 10,008,754 B2 | 6/2018 | Englert |
| 10,014,530 B2 | 7/2018 | Lang et al. |
| 10,033,036 B2 | 7/2018 | Christensen et al. |
| 10,044,082 B2 | 8/2018 | Suyama et al. |
| 10,147,988 B2 | 12/2018 | Park et al. |
| 2002/0155351 A1 | 10/2002 | Licht |
| 2004/0221426 A1 | 11/2004 | Igawa et al. |
| 2005/0042503 A1 | 2/2005 | Kim et al. |
| 2005/0123815 A1 | 6/2005 | Tsai et al. |
| 2006/0040174 A1 | 2/2006 | Peabody |
| 2006/0194107 A1 | 8/2006 | Licht |
| 2007/0141456 A1 * | 6/2007 | Wang .................... H01M 12/08 429/144 |
| 2008/0131762 A1 | 6/2008 | Joo et al. |
| 2010/0062313 A1 | 3/2010 | Browning et al. |
| 2010/0119895 A1 | 5/2010 | Friesen |
| 2010/0310905 A1 | 12/2010 | Oriet et al. |
| 2011/0027648 A1 | 2/2011 | Rolison et al. |
| 2011/0070506 A1 | 3/2011 | Friesen et al. |
| 2011/0250512 A1 | 10/2011 | Friesen et al. |
| 2012/0021303 A1 | 1/2012 | Amendola et al. |
| 2012/0052404 A1 | 3/2012 | Friesen et al. |
| 2012/0068667 A1 | 3/2012 | Friesen et al. |
| 2012/0098499 A1 | 4/2012 | Friesen et al. |
| 2012/0187918 A1 | 7/2012 | Narayan et al. |
| 2012/0202127 A1 | 8/2012 | Friesen et al. |
| 2012/0295172 A1 | 11/2012 | Peled et al. |
| 2013/0022881 A1 | 1/2013 | Friesen et al. |
| 2013/0095393 A1 | 4/2013 | Friesen et al. |
| 2013/0115523 A1 | 5/2013 | Friesen et al. |
| 2013/0115525 A1 | 5/2013 | Friesen et al. |
| 2013/0115526 A1 | 5/2013 | Friesen et al. |
| 2013/0115531 A1 | 5/2013 | Amendola et al. |
| 2013/0115533 A1 | 5/2013 | Friesen et al. |
| 2013/0149615 A1 | 6/2013 | Narayan et al. |
| 2013/0183591 A1 | 7/2013 | Dickson |
| 2013/0189592 A1 | 7/2013 | Roumi et al. |
| 2013/0295471 A1 | 11/2013 | Visco et al. |
| 2014/0162129 A1 | 6/2014 | Kim et al. |
| 2014/0217985 A1 | 8/2014 | Gifford et al. |
| 2014/0220256 A1 | 8/2014 | Ogg |
| 2014/0220432 A1 | 8/2014 | Ogg et al. |
| 2014/0220434 A1 | 8/2014 | Ogg |
| 2014/0220435 A1 | 8/2014 | Ogg et al. |
| 2014/0220440 A1 | 8/2014 | Ogg |
| 2014/0220460 A1 | 8/2014 | Ogg et al. |
| 2014/0234730 A1 | 8/2014 | Albertus et al. |
| 2014/0342214 A1 | 11/2014 | Wegner et al. |
| 2015/0086884 A1 | 3/2015 | Narayan et al. |
| 2015/0111115 A1 * | 4/2015 | Nitta ...................... H01M 4/06 429/406 |
| 2015/0372357 A1 | 12/2015 | Kruglak et al. |
| 2016/0020493 A1 | 1/2016 | Van Dijk et al. |
| 2016/0036094 A1 | 2/2016 | Ogg |
| 2016/0036095 A1 | 2/2016 | Ogg |
| 2017/0141434 A1 | 5/2017 | Narayan et al. |
| 2018/0010228 A1 | 1/2018 | Ogg et al. |
| 2018/0123116 A1 | 5/2018 | Lee et al. |
| 2018/0219220 A1 | 8/2018 | Hayashi et al. |
| 2018/0241107 A1 | 8/2018 | Su et al. |
| 2020/0006745 A1 | 1/2020 | Westwood et al. |
| 2020/0006828 A1 * | 1/2020 | Milshtein ........ H01M 10/4214 |
| 2020/0411932 A1 * | 12/2020 | Weber .................... H01M 12/02 |

FOREIGN PATENT DOCUMENTS

| | | |
|---|---|---|
| EP | 0637291 B1 | 10/1997 |
| EP | 0664932 B1 | 1/1998 |
| EP | 0823135 B1 | 11/1998 |
| EP | 0835334 B1 | 9/2002 |
| EP | 1027747 B1 | 9/2002 |
| EP | 1413001 B1 | 4/2005 |
| EP | 1266413 B1 | 5/2005 |
| EP | 1977475 B1 | 2/2012 |
| EP | 2486622 B1 | 7/2014 |
| EP | 2424016 B1 | 10/2014 |
| EP | 2823528 B1 | 3/2016 |
| EP | 2586092 B1 | 1/2017 |
| EP | 2619835 B1 | 6/2017 |
| EP | 2792004 B1 | 11/2017 |
| EP | 2721688 B1 | 2/2018 |
| EP | 2774205 B1 | 3/2018 |
| EP | 2954583 B1 | 4/2018 |
| EP | 2559097 B1 | 5/2018 |
| EP | 2596545 B1 | 6/2018 |
| EP | 2659536 B1 | 8/2018 |
| IN | 201917002254 A | 4/2019 |
| JP | 3387724 B2 | 1/2003 |

(56) References Cited

FOREIGN PATENT DOCUMENTS

| | | | |
|---|---|---|---|
| JP | 2010140736 A | 6/2010 | |
| JP | 2010-192313 A | 9/2010 | |
| JP | 2010-262876 A | 11/2010 | |
| JP | 2013134838 A | 7/2013 | |
| JP | 2014127289 A | 7/2014 | |
| JP | 2014150056 A | 8/2014 | |
| JP | 2015076379 A | 4/2015 | |
| JP | 5952540 B2 | 6/2016 | |
| JP | 6032018 B2 | 11/2016 | |
| JP | 6234917 B2 | 11/2017 | |
| JP | 2017216126 A | 12/2017 | |
| JP | 2018006057 A | 1/2018 | |
| JP | 2018067399 A | 4/2018 | |
| JP | 6352884 B2 | 6/2018 | |
| JP | 2018529207 A | 10/2018 | |
| JP | 6682102 B2 | 3/2020 | |
| KR | 10-2018-0063144 A | 6/2018 | |
| WO | WO8402429 A1 | 6/1984 | |
| WO | WO2012174433 A3 | 12/2012 | |
| WO | WO2015042573 A1 | 3/2015 | |
| WO | WO2015145690 A1 | 10/2015 | |
| WO | WO2015150784 A1 | 10/2015 | |
| WO | WO2017-006666 A1 | 1/2017 | |
| WO | WO2017-049414 A1 | 3/2017 | |
| WO | WO2017075577 A1 | 5/2017 | |
| WO | WO2017117373 A1 | 7/2017 | |
| WO | WO2017-223219 A1 | 12/2017 | |
| WO | WO2018009930 A2 | 1/2018 | |
| WO | WO2018018036 A1 | 1/2018 | |
| WO | WO2018187561 A1 | 10/2018 | |
| WO | WO2020006419 A1 | 1/2020 | |
| WO | WO2020023912 A1 | 1/2020 | |

OTHER PUBLICATIONS

Machine translation of WO 2015/145690 A1 (no date).*
Tekin, B. et al., "A New Sodium-Based Aqueous Rechargeable Battery System: The Special Case of Na0.44MnO2/Dissolved Sodium Polysulfide," View online DOI: 10.1002/ente.201700245, Energy Technol. vol. 5, pp. 2182-2188, (2017).
Tian, B. et al., "The effect of Na2S additive in alkaline electrolyte on improved performances of Fe-based air batteries," Electrochimica Acta, vol. 259, pp. 196-203, (2018).
Trocino, S. et al., "High performance solid-state iron-air rechargeable ceramic battery operating at intermediate temperatures (500-650 ° C.)," Applied Energy, pp. 233-234 & pp. 386-394, (2019).
Vijayamohanan, K. et al., "Rechargeable Alkaline Iron Electrodes," Journal of Power Sources, vol. 34, pp. 269-285, (1991).
Wei, X. et al., "An Aqueous Redox Flow Battery Based on Neutral Alkali Metal Ferri/ferrocyanide and Polysulfide Electrolytes," Journal of The Electrochemical Society, vol. 163, No. 1, pp. A5150-A5153, (2016).
Weinrich, H. et al., "Understanding the Nanoscale Redox-Behavior of Iron-Anodes for Rechargeable Iron-Air Batteries," View Online https://doi.org/10.1016/j.nanoen.2017.10.023, Nano Energy, Institute of Energy and Climate Research-Fundamental Electrochemistry (IEK-9) Center for Nanophase Materials Sciences, Oak Ridge National Laboratory, Oak Ridge, Tennessee 378, US, 46 pages, (2017).
Wilke, S. K. et al., "Structural evolution of directionally freeze-cast iron foams during oxidation/reduction cycles," Acta Materialia, vol. 162, pp. 90-102, (2019).
Yang, B. et al., "Organo-Sulfur Molecules enable iron-based battery electrodes to meet the challenges of large-scale electrical energy storage," Energy Environ. Sci., vol. 7, pp. 2753-2763, (2014).
Yang, C. et al., "Unique aqueous Li-ion/sulfur chemistry with high energy density and reversibility," View online, www.pnas.org/cgi/doi/10.1073/pnas.1703937114, PNAS, vol. 114, No. 24, pp. 6197-6202, (2017).
You, S. et al., "A microbial fuel cell using permanganate as the cathodic electron acceptor," Journal of Power Sources, vol. 162, pp. 1409-1415, (2006).
Yu, X. et al., "A Voltage-Enhanced, Low-Cost Aqueous Iron-Air Battery Enabled with a Mediator-Ion Solid Electrolyte," View Online DOI: 10.1021/acsenergylett.7b00168, ACS Energy Lett., vol. 2, pp. 1050-1055, (2017).
Yun, S. et al., "Materials and Device Constructions for Aqueous Lithium-Sulfur Batteries," View online DOI: 10.1002/adfm.201707593, Adv. Funct. Mater., vol. 28, pp. 1-17 (1707593), (2018).
Sayilgan, E. et al., "A review of technologies for the recovery of metals from spent alkaline and zinc-carbon batteries", Hydrometallurgy, 2009, vol. 97, Issues 3-4, pp. 158-166.
Chakraborty, R. et al., "Negative Electrodes For Electrochemical Cells," U.S. Appl. No. 16/523,722, filed Jul. 26, 2019.
Ai, W. et al., "A Novel Graphene-Polysulfide Anode Material for High-Performance Lithium-Ion Batteries," Scientific Reports, vol. 3, No. 234, pp. 1-5, DOI: 10.1038/srep0234, (2013).
Al-Hoshan, M. S. et al., "Synthesis, Physicochemical and Electrochemical Properties of Nicekl Ferrite Spinels Obtained by Hydrothermal Method for the Oxygen Evolution Reaction (OER)," Int. J. Electrochem. Sci., vol. 7, pp. 4959-4973, (2012).
Arunchander, A. et al., "Synthesis of flower-like molybdenum sulfide/graphene hybrid as an efficient oxygen reduction electrocatalyst for anion exchange membrane fuel cells," Journal of Power Sources, vol. 353, pp. 104-114, (2017).
Bandal, H. et al., "Iron-based heterogeneous catalysts for oxygen evolution reaction; change in perspective from activity promoter to active catalyst," Journal of Power Sources, vol. 395, pp. 106-127, (2018).
Blurton, K. F. et al., "Metal/Air Batteries: Their Status and Potential—A Review," Journal of Power Sources, vol. 4, pp. 263-279, (1979).
Burke, M. S. et al., "Cobalt-Iron (Oxy)Hudroxide Oxygen Evlolution Electrocatalysts: The Role of Structur5e and Composition on Activity, Stability, and Mechanism," J. Am. Chem. Soc., vol. 137, pp. 3638-3648, DOI: 10.1021/acs.5b00281, (2015).
Burke, M. S. et al., "Oxygen Evolution Reaction Electrocatalysis on Transition Metal Oxides and (Oxy)hydroxides: Activity Trends and Design Principles," Department of Chemistry and Biochemistry, University of Oregon, Eugene, Oregon 97403, United States, Chemistry of Materials, 10 pages, (2015).
Chen, Y. et al., "Harvesting polysulldes by sealing the sulfur electrode in a composite ion-selective net," Journal of Power Sources, vol. 368, pp. 38-45, (2017).
Chiang, Y.M. et al., High Capacity, Temperature-Stable Lithium Aluminum Manganese Oxide Cahtodes for Rechargeable Batteries, Electrochemical and Solid-State Letters, vol. 2, No. 3, pp. 107-110, (1990).
Colli, A. N. et al., "High energy density MnO4-/MnO42 redox couple for alkaline redox flow batteries," Chem. Commun., vol. 52, pp. 14039-14042, (2016).
Cui, B. et al., "Improved Cycle Iron Molten Air Battery Performance Using a Robust Fin Air Electrode," Journal of The Electrochemical Society, vol. 164, No. 2, pp. A88-A92, (2017).
Demir-Cakan, R. et al., "An aqueous electrolyte rechargeable Li-ion/polysullde battery," Journal of Materials Chemistry A, View Article Online DOI: 10 1039/c4ta01308e, 5 pages, (2014).
Demir-Cakan, R. et al., "Use of ion-selective polymer membranes for an aqueous electrolyte rechargeable Li-ion-polysulphide battery," View Online DOI: 10 1039/c4ta05756b, J. Mater. Chem. A, vol. 3, pp. 2869-2875, (2015).
Egashira, M. et al., "Iron-Air (Secondary and Primpary)," Yamaguchi University, Yamaguchi, Japan & 2009 Elsevier B.V. All rights reserved, pp. 372-375, (2009).
Figueredo-Rodriguez, H. A. et al., "A Rechargeable, Aqueous Iron Air Battery with Nanostructured Electrodes Capable of High Energy Density Operation," Journal of The Electrochemical Society, vol. 164, No. 6, pp. A1148-A1157, (2017).
Gross, M. M. et al., "Aqueous Polysulfide-Air Battery with a Mediator-Ion Solid Electrolyte and a Copper Sullde Catalyst for Polysulfide Redox," View Online DOI: 10.1021/acsaem.8b01679, ACS Applied Energy Materials, vol. 1, No. 12, pp. 7230-7236, (2018).

(56) References Cited

OTHER PUBLICATIONS

Hall, D. E., "Ni(OH)2_Impregnated Anodes for alkaline Water Electrolysis," J. Electrochem. So., vol. 130, No. 2, pp. 317-321, (1983).

Hall, D. E., "Electrolysis: Corrosion Resistance," J. Electrochem. Soc., vol. 129, No. 2, pp. 310-315, (1982).

Hang, B. T. et al., "Effect of metal-sulfide additives on electrochemical properties of nano-sized Fe2O3-loaded carbon for Fe/air battery anodes," Journal of Power Sources, vol. 168, pp. 522-532, (2007).

Hang, B. T. et al., "Effect of additives on the electrochemical properties of Fe2O3/C nanocomposite for Fe/air battery anode," Journal of Electroanalytical Chemistry, vol. 762, pp. 59-65, (2016).

Notification Concerning Transmittal of a International Preliminary Report on Patentability and Written Opinion of the International Search Authority for International Patent Application No. PCT/US2018/026243, dated Oct. 17, 2019 9 pages.

International Search Report and Written Opinion of the International Searching Authority for International Patent Application No. PCT/US2018/026243, dated Jul. 27, 2018, 12 pages.

International Search Report and Written Opinion of the International Searching Authority for International Patent Application No. PCT/US2019/039844, dated Oct. 23, 2019, 15 pages.

International Search Report and Written Opinion of the International Searching Authority for International Patent Application No. PCT/US2019/039867, dated Nov. 15, 2019, 19 pages.

International Search Report and Written Opinion of the International Searching Authority for International Patent Application No. PCT/US2019/039973, dated Jan. 13, 2020, 26 pages.

International Search Report and Written Opinion of the International Searching Authority for International Patent Application No. PCT/US2019/043745, dated Nov. 13, 2019, 17 pages.

Ji, X. et al., "Stabilizing lithium-sulphur cathodes using polysulphide reservoirs," View Online DOI: 10.1038/ncomms1293, Nature Communications, vol. 2, No. 325, 8 pages, (2011).

Jin, X. et al., "A high-Idelity multiphysics model for the new solid oxide iron-air redox battery part I: Bridging mass transport and charge transfer with redox cycle kinetics," Journal of Power Sources, vol. 280, pp. 195-204, (2015).

Kadyk, T. et al., "How to Enhance Gas Removal from Porous Electrodes?" View Online DOI: 10.1038/SREP38780, Scientific Reports, vol. 6, No. 38780, pp. 1-14, (2016).

Klaus, S. et al., "Elects of Fe Electrolyte Impurities on Ni(OH)2/NiOOH Structure and Oxygen Evolution Activity," View Online DOI:10.1021/acs.jpcc.5b00105, Journal of Physical Chemistry C, vol. 119, No. 13, pp. 7243-7254, (2015).

Licht, S., "A Novel Aqueous Aluminum permanganate fuel cell," Electrochemistry Communications, vol. 1, pp. 33-36, (1999).

Li, Z. et al., "Air-Breathing Aqueous Sulfur Flow Battery for Ultralow-Cost Long-Duration Electrical Storage," Joule vol. 1, pp. 306-327, Oct. 11, 2017, 2017 Published by Elsevier Inc., (2017).

Li, Z. et al., A high-energy and low-cost polysullde/iodide redox "ow battery," Nano Energy, vol. 30, pp. 283-292, (2016).

Mainar, A. R. et al., "Alkaline aqueous electrolytes for secondary zinc-air batteries: an overview," Int. J. Energy Res. 2016; vol. 40, pp. 1032-1049, (2016).

Malkhandi, S. et al., "Organo-Sulfur Additives for Suppressing Hydrogen Evolution in Iron-air Battery," Abstract #688, 220th ECS Meeting, 2011 The Electrochemical Society.

Matsuda, A. et al., "Preparation of hydroxide ion conductive KOH—ZrO2 electrolyte for all-solid state iron/air secondary battery," Solid State Ionics, vol. 262, pp. 188-191, (2014).

Maurya, S. et al., "A review on recent developments of anion exchange membranes for fuel cells and redox flow batteries," View online DOI: 10.1039/c5ra04741b, RSC Adv., vol. 5, pp. 37206-37230, (2015).

McKerracher, R. D. et al., "A Review of the Iron-Air Secondary Battery for Energy Storage," View online DOI: 10.1002/cplu.201402238, ChemPlusChem 2015, vol. 80, pp. 323-335, (2015).

Merle, G. et al., "Anion exchange membranes for alkaline fuel cells: A review," Journal of Membrane Science, vol. 377, pp. 1-35, (2011).

Mitra, D. et al., "An Efficient and Robust Surface-Modified Iron Electrode for Oxygen Evolution in AlkalineWater Electrolysis," Journal of The Electrochemical Society, vol. 165, No. 5, pp. F392-F400, (2018).

Mitra, D. et al., "A Stable and Electrocatalytic Iron Electrode for Oxygen Evolution in Alkaline Water Electrolysis," View Online https://doi.org/10.1007/s11244-018-0971-9, Springer Science+Business Media, LLC, part of Springer Nature 2018.

Narayan, S. R. et al., "Bi-Functional Oxygen Electrodes—Challenges and Prospects," The Electrochemical Society Interface, Summer 2015, pp. 65-69, (2015).

Neburchilov, V. et al., "Metal-Air and Metal-Sulfur Batteries: Fundamentals and Applications," CRC Press Taylor & Francis Group, 6000 Broken Sound Parkway NW, Suite 300, Boca Raton, FL 33487-2742, © 2017 by Taylor & Francis Group, LLC, CRC Press is an imprint of Taylor & Francis Group, an Informa business.

Ojefors, L. et al., "An-iron-Air Vehicle Battery," Journal of Power Sources, vol. 2, pp. 287-296, (1977).

Pan, J. et al., "Constructing Ionic Highway in Alkaline Polymer Electrolytes," Energy Environ. Sci. 2014, vol. 7, pp. 354-360, (2014).

Roe, S. et al., "A High Energy Density Vanadium Redox Flow Battery with 3 M Vanadium Electrolyte," Journal of The Electrochemical Society, vol. 163, No. 1, pp. A5023-A5028, (2016).

Sen, R. K. et al., "Metal-Air Battery Assessment," Prepared for Office of Energy Storage and Distribution Conservation and Renewable Energy, The U.S. Department of Energy under Contract DE-AC06-76RLO 1830, Pacific Northwest Laboratory, Operated for the U.S. Department of Energy, 96 pages, (1988).

Sevinc, S. et al., "In-situ tracking of NaFePO4 formation in aqueous electrolytes and its electrochemical performances in Na-ion/polysul!de batteries," Journal of Power Sources, vol. 412, pp. 55-62, (2019).

Smith, R. D. L. et al., "Water Oxidation Catalysis: Electrocatalytic Response to Metal Stoichiometry in Amorphous Metal Oxide Films Containing Iron, Cobalt, and Nickel," J. Am. Chem. Soc., vol. 135, No. 31, pp. 11580-115, (2013).

Notification of Transmittal of the International Search Report and Written Opinion of the International Search Authority for International Patent Application No. PCT/US2018/026243, dated Jul. 27, 2018, 12 pages.

* cited by examiner

REFUELABLE BATTERY FOR THE ELECTRIC GRID AND METHOD OF USING THEREOF

RELATED APPLICATIONS

This application claims the benefit of priority to U.S. Provisional Patent Application 62/482,639 entitled "System and Method for a Refuelable Primary Battery for the Electric Grid" filed Apr. 6, 2017, the entire contents of which are hereby incorporated by reference for all purposes.

TECHNICAL FIELD

This invention relates generally to the field of grid battery power, and more specifically to a new and useful system and method for a refuelable battery power grid solution.

BACKGROUND

There is much interest in finding and implementing energy solutions that move towards renewable energy and having a lower environmental impact. In recent years, renewable energy sources such as solar and wind have grown in usage. In many regions, initiatives are underway to move towards fully renewable in the future. However, there are still challenges to achieving fully renewable power supply in all regions.

Variability in supply is one challenge. Supply can vary by geography, weather, climate, and other factors. Many forms of renewable electricity production rely on the seasons to provide stored energy. For example, snowpack in the mountains in winter provides water in the summer which is used for hydropower. Additionally, renewable energy sources are often tied to the availability of energy sources for a particular region. Wind, solar, hydro, and/or other sources have different levels of applicability and various seasonal factors depending on the region. For example, solar in regions higher in the northern hemisphere or lower in the southern hemisphere will have seasonal trends. Technical solutions for seasonal variability currently don't exist.

Use of secondary batteries (i.e., batteries that are charged and discharge through a reversible electrochemical reaction) as temporary storage of power have received interest as a potential solution to variability of renewable energy. An often-cited use case is that of batteries being able to store power from solar during the day, and then supplying the grid with the power at night or times of low solar power supply. However, this fails to address larger periods of unpredictability. Secondary batteries are primarily designed to meet the needs of frequent discharge and charge cycles as is typical in daily usage cycles. Research has driven second batteries to be inexpensive over many cycles, but too costly to use in low cycle applications. Furthermore, secondary batteries, despite considerable research, often rely on materials that are not sufficiently earth abundant.

SUMMARY

Systems and methods of the various embodiments may provide a refuelable battery for the electric power grid and/or other power system to provide a sustainable, cost-effective, and/or operationally efficient solution to energy source variability and/or energy demand variability. In particular, the systems and methods of the various embodiments may provide a refuelable primary battery solution that addresses bulk seasonal energy storage needs, energy demand variation, and other challenges.

Systems and methods of the various embodiments may be employed in combination with a primary energy source connected to the power grid or other power requiring systems. The systems and methods of the various embodiments may utilize primary battery units within a battery power supply site. In various embodiments, the primary battery units may cycle through usage with a supply system supporting a "refueling process" on-site and/or offsite. In various embodiments, at the end of discharge, a primary battery unit may be decommissioned and the spent fuel (i.e., battery chemical materials) removed and new fuel added. In various embodiments, the refueling process may include the delivery, removal, and/or exchange of primary battery units and/or material components of the primary battery units. In various embodiments, the battery material components removed/exchanged in the primary battery units may include anodes of the primary battery units and/or cathodes of the primary battery units.

Various embodiments may provide a refuelable battery including a battery chamber configured to trap expended electrode material generated from electrode material of the battery while the battery is operating in a discharge mode. Expended electrode material may include oxidized anode material and/or reduced cathode material generated while the battery is operating in a discharge mode. The expended electrode material may be removed and reprocessed into recharged electrode material for use in the battery according to various embodiments. Various embodiments may provide a refuelable battery including a battery chamber configured to trap anode material, such as oxidized anode particulate, oxidized anode powder, oxidized anode shards, etc., generated from anode material of the battery while the battery is operating in a discharge mode. The oxidized anode material may be removed and reprocessed into recharged anode material for use in the battery according to various embodiments. Various embodiments may provide a refuelable battery including a battery chamber configured to trap cathode material, such as reduced cathode particulate, reduced cathode powder, reduced cathode shards, etc., generated from cathode material of the battery while the battery is operating in a discharge mode. The reduced cathode material may be removed and reprocessed into recharged cathode material for use in the battery according to various embodiments.

BRIEF DESCRIPTION OF THE FIGURES

The accompanying drawings, which are incorporated herein and constitute part of this specification, illustrate example embodiments of the claims, and together with the general description given above and the detailed description given below, serve to explain the features of the claims.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims. The following description of the embodiments of the invention is not intended to limit the invention to these embodiments but rather to enable a person skilled in the art to make and use this invention.

Systems and methods of the various embodiments may provide a refuelable battery to provide a sustainable, cost-effective, and/or operationally efficient solution to matching energy supply and demand variability. In particular, the systems and methods of the various embodiments may provide a refuelable primary battery solution that addresses various challenges, including bulk seasonal energy storage needs, demand increase response needs, etc.

Systems and methods of the various embodiments may be employed in combination with a primary energy source connected to a power grid. The systems and methods of the various embodiments may utilize primary battery units within a battery power supply site. A primary battery unit or primary battery may be a battery unit or battery that is not recharged through an electrochemical reaction. A battery power supply site may be a site, such as a battery power plant or system, including at least one battery configured to output energy, such as to a power grid or other system. In various embodiments, the primary battery units may cycle through usage with a supply system supporting a "refueling process" which may be located on-site and/or offsite. In various embodiments, at the end of discharge, a primary battery unit may be decommissioned and the spent fuel (i.e., battery chemical materials, such as anode materials, cathode materials, etc.) removed and new fuel added. In various embodiments, the refueling process may include the delivery, removal, and/or exchange of primary battery units and/or material components of the primary battery units. In various embodiments, the refueling process may include physical replacement of electrode materials (e.g., anode materials, cathode materials, etc.) within the primary battery units. For example, a primary battery unit may be refueled by inserting a new anode and/or a new cathode into the primary battery unit.

Figure 1:
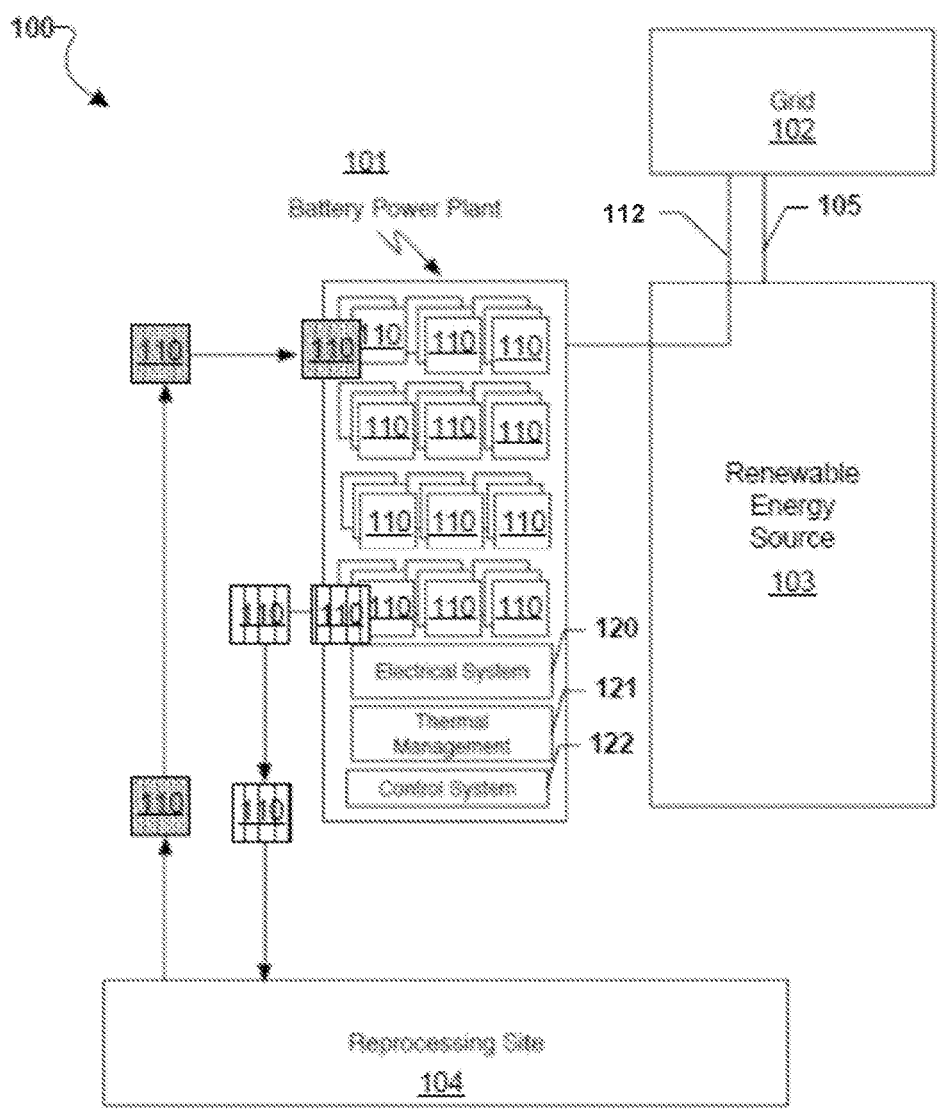
FIG. 1 is a schematic representation of an embodiment system.

FIG. 1 illustrates a refuelable battery power grid system 100 according to various embodiments. In the refuelable battery power grid system 100, a refuelable battery power plant (or system) 101 may be set up on-site at a renewable energy source 103 (e.g., a wind farm, hydroelectric dam, solar farm, etc.). The refuelable battery power grid system 100 may include a battery power plant 101 that includes a plurality of connected battery units 110, such as primary battery units. The battery power plant 101 may additionally include various systems configured to manage the operation and refueling of the battery power plant 101, such as an electrical system 120, thermal management system 121, and control system 122. The thermal management system 121 may include temperature sensing and regulating components. The electrical system 120 may include various components such as an inverter. In one variation, the inverter may be a unilateral power inverter. The control system 122 may manage operation of the set of primary battery units 110. The control system 122 may additionally include a data interface to a primary power system or an associated data source. The control system 122 may facilitate selection of primary battery units 110, activation of primary battery units 110, and/or other operations. In one mode of operation, the control system 122 may utilize the primary battery units 110 in a manner at least partially coordinated with refueling capacity.

The refuelable battery power grid system 100 may function as an on-site installation that interfaces with a consumer of the energy. The consumer of the energy may preferably be a connected power grid 102, but may alternatively be any suitable system such as building, factory, or other suitable energy powered system. The battery power plant 101 may be installed onsite with a renewable energy source 103, such as a wind farm, a hydroelectric plant, a solar farm, or any suitable energy production site. The renewable energy source 103 may connect to the grid 102 directly via a primary power connection 105. The battery power plant 101 may connect to the grid 102 via a supplementary power connection 112 that connects to the grid 102 through the renewable energy source 103. In this manner, power supplied to the grid 102 from the battery power plant 101 via the supplementary power connection 112 may appear to the grid 102 as if received from the renewable energy source 103.

The battery power plant 101 may be setup with stationary equipment to support the operation of the refuelable battery power grid system 100. Transportation access may be positioned near the battery power plant 101 to facilitate convenient refueling. Refueling of primary battery units 110 may be handled using typically available machinery and tools. A full-scale solution may then reprocess the battery materials of the primary battery units 110 at a second site, such as reprocessing site 104. In some cases, this reprocessing site 104 may be located in a location with an alternative power source (such as an alternative power source using renewable energy generated by renewable energy source 103 (or another renewable energy source) during periods when renewable energy is abundant). In other cases, the reprocessing site 104 may be in connection with the power grid 102. In various embodiments, reprocessing of the primary battery units 110 may occur during seasonal periods that result in excess renewable energy generated by renewable energy source 103 (or another renewable energy source).

In one variation, the battery power plant 101 may include docking stations for the primary battery units 110. There will preferably be a large number of primary battery units 110 that will be installed to supplement power production over long seasonal periods. The number of docking stations may include enough docking stations to house active primary battery units 110, depleted primary battery units 110 awaiting refueling/removal, and reserve primary battery units 110. When a primary battery unit 110 is depleted it will need to be refueled, and as such, there are preferably sufficient docking stations so that the power supply target may be satisfied while primary battery units 110 are being refueled before the active primary battery units 110 are depleted.

The battery power plant 101 may include an array of docking stations. In one variation, the docking stations may allow stacking of primary battery units 110. In some variations, the battery power plant 101 may include lifts and/or conveyors to facilitate installing/instantiating and/or removal of primary battery power units.

The primary battery unit 110 functions as the source of power. The primary battery unit 110 includes primary battery elements that may use any suitable chemistry such as Al, $AlCl_3$, Fe, $FeO_x(OH)_y$, $Na_xS_y$, $SiO_x(OH)_y$, $AlO_x(OH)_y$, and/or any suitable type of primary battery chemistry. Similarly, the primary battery unit 110 may use a solid material, such as a sheet, foil, rod, or disc for the primary battery active material. In certain other embodiments, the primary battery unit 110 may use a powdery form, such as a particulate, for the primary battery active material. In certain other embodiments, the primary battery unit 110 may use a slurry such as a colloid, suspension, or dispersion suitable material state for the primary battery active material.

The primary battery units 110 may additionally include an activator mechanism wherein, the materials of the primary battery unit 110 can be kept separated or otherwise inactive until it nears the time for use of the primary battery unit 110. This may function to better hold energy during storage by mitigating self-discharge reactions which occur when the primary battery active material is in contact with the electrolyte.

The primary battery unit 110 may be composed of multiple cells. Individual battery cells maybe any suitable form factor. Additionally, a primary battery unit 110 itself may be composed of sub-units. For example, a primary battery unit 110 may be a container that can contain a number of sub-units, which may be exchangeable by human workers or machines. In part because of the amount of energy the refuelable battery power grid system 100 is expected to deliver, the primary battery units 110 may have a large form factor (e.g., several hundred or thousand pounds).

The primary battery units 110 may use materials that are earth abundant, non-toxic, recyclable/reusable, and cost effective. In various embodiments, the primary battery units 110 may be processed and/or reprocessed at scale at dedicated sites, such as reprocessing site 104. Primary battery units 110 and/or the refueling material used in the primary battery units 110 may be transported onsite for use with refuelable battery power grid system 100.

In some refueling options, the primary battery units 110 may be exchanged as a form of refueling the energy supply. In some implementations, the primary battery unit 110 may include a housing that conforms to a form factor compatible with shipping containers, which may make the primary battery unit 110 easily transported using standard industrial equipment such as forklifts, cranes, conveyors, and also loaded onto trucks or onto trains.

In an alternative refueling option, the primary battery units 110 may have depleted material removed and processed material added. Depleted (i.e., expended) electrode materials may be removed and processed (i.e., new or recharged) electrode material may be added. For example, an anode material of the primary battery unit 110 may oxidize during discharge into oxidized anode material, such as oxidized anode particulate, oxidized anode powder, oxidized anode shards, etc., that may be removed, reprocessed at the reprocessing site 104 into a new anode material, and the new reprocessed anode material may be inserted into the primary battery unit 110 to thereby refuel the primary battery unit 110. As another example, a cathode material of the primary battery unit 110 may reduce during discharge into reduced cathode material, such as reduced cathode particulate, reduced cathode powder, reduced cathode shards, etc., that may be removed, reprocessed at the reprocessing site 104 into a new cathode material, and the new reprocessed cathode material may be inserted into the primary battery unit 110 to thereby refuel the primary battery unit 110. The primary battery unit 110 may include a material refueling supply system that may manage or facilitate removal and deposit of materials to renew the stored energy of the primary battery units. For example, the primary battery unit 110 may include pumps and/or circulation systems to facilitate removal and deposit of materials. Additionally, the primary battery unit 110 may include access ports to enable material to be placed into the primary battery unit 110, such as refueled electrode material (e.g., refueled anode and/or cathode material) to be placed on one or more electrode supports (e.g., one or more anode and/or cathode supports) in the primary battery unit 110. The primary battery unit 110 may include access ports to enable material to be removed from the primary battery unit 110, such as expended electrode material (e.g., oxidized anode material such as oxidized anode particulate, oxidized anode powder, oxidized anode shards, etc. and/or reduced cathode material such as reduced cathode particulate, reduced cathode powder, reduced cathode shards etc.) generated while the primary battery unit 110 is operating in a discharge mode. Further, the primary battery unit 110 may include valves and other partitions operable to fluidically isolate portions of the primary battery unit 110 from one another to support insertion or removal of material from the primary battery unit 110. For example, a filter area trapping oxidized anode material may be fluidically isolated from the rest of the primary battery unit 110 to enable the electrolyte to be drained from the filter area and the oxidized anode material to be removed to be reprocessed into new anode material at the reprocessing site 104. Similarly, a filter area may trap reduced cathode material and may be fluidically isolated from the rest of the primary battery unit 110 to enable the electrolyte to be drained from the filter area and the reduced cathode material to be removed to be reprocessed into new cathode material at the reprocessing site 104. As another example, valves and pumps may enable the electrolyte level of the primary battery unit 110 to be raised and/or lowered.

The primary battery unit 110 may include integrated unit control systems, power management, thermal systems, data connections, and/or other features. The primary battery unit 110 may additionally include a power and control interface such that it can be installed and removed from a docking station. The power and control interface may be configured to automatically connect when inserted into the docking station. Alternatively, the primary battery unit 110 may be manually connected to the battery power plant 101.

In some variations, the refuelable battery power grid system 100 may include a mixture of battery power sources, which can include batteries with different chemistries. In some variations, secondary batteries may be integrated into the refuelable battery power grid system 100 to provide temporary storage of excess storage alongside bulk energy storage of the primary battery units 110. For example, the refuelable battery power grid system 100 may include electrochemically rechargeable lithium-ion batteries along with the primary battery units 110.

The reprocessing site 104 may be a refueling system that functions to facilitate the restocking of energized primary battery units 110 after they are depleted. For example, the reprocessing site 104 may restock/reenergize the electrode materials after they are expended/depleted. As a specific example, when the primary battery units utilize iron based anodes that need restocking/reenergizing, oxidized anode material from the primary battery units 110 may be reprocessed into new anode material by reduction (e.g., direct reduction iron (DRI) processing, hot briquetted iron (HBI) processing, etc.), smelting, electrolysis, or any other reprocessing operation (e.g., any metallurgical process that generates new anode material) at the reprocessing site 104.

In a first variation, the primary battery units 110 may be reprocessed. Such reprocessing may include the removal of the primary battery unit 110 from the battery power plant 101, transport to the reprocessing site 104, where reusable components and materials may be extracted and reprocessed into an energized primary battery unit 110. In some cases, non-reusable materials and components may be recycled, disposed of, and/or replaced. In an implementation, reprocessing may be performed at a site with a source of renewable energy. Reprocessing may alternatively happen at the same site as the battery power plant 101 and in some cases may be performed during the season when there is excess renewable energy generated by renewable energy source 103.

In another variation, the primary battery units 110 have a chemical makeup where material may be extracted and replaced to energize the primary battery unit 110. For example, expended electrode material may be collected and removed for reprocessing. As a specific example, as anode material of a primary battery unit 110 is oxidized it may be collected and removed for reprocessing. The reprocessing at the reprocessing site 104 may generate new anode material that may then be inserted into the primary battery unit 110 to refuel the primary battery unit 110. Thus, the entire primary battery unit 110 may not be removed for reprocessing, and only a portion of the materials within the primary battery unit 110 may be removed for reprocessing. The refuelable battery power grid system 100 and battery power plant 101 may incorporate mechanisms to support the efficient material removal and material depositing in depleted primary battery units 110. For example, the primary battery unit 110 may include pumps and/or circulation systems to facilitate removal and deposit of materials. Additionally, the primary battery unit 110 may include access ports to enable material to be placed into the primary battery unit 110, such as refueled anode and/or cathode material to be placed on one or more anode and/or cathode supports in the primary battery unit 110. The primary battery unit 110 may include access ports to enable material to be removed from the primary battery unit 110, such as expended electrode material (e.g., oxidized anode material such as oxidized anode particulate, oxidized anode powder, oxidized anode shards, etc. and/or reduced cathode material such as reduced cathode particulate, reduced cathode powder, reduced cathode shards etc.) generated while the primary battery unit 110 is operating in a discharge mode. Further, the primary battery unit 110 may include valves and other partitions operable to fluidically isolate portions of the primary battery unit 110 from one another to support insertion or removal of material from the primary battery unit 110. For example, a filter area trapping oxidized anode material may be fluidically isolated from the rest of the primary battery unit 110 to enable the electrolyte to be drained from the filter area and the oxidized anode material to be removed to be reprocessed into new anode material at the reprocessing site 104. Similarly, a filter area may trap reduced cathode material and may be fluidically isolated from the rest of the primary battery unit 110 to enable the electrolyte to be drained from the filter area and the reduced cathode material to be removed to be reprocessed into new cathode material at the reprocessing site 104. As another example, valves and pumps may enable the electrolyte level of the primary battery unit 110 to be raised and/or lowered.

As one potential benefit, the refuelable battery power grid system 100 may offer energy at scale during periods of seasonally low renewable power availability. The battery power plant 101 may be customized to account for long seasonal patterns in use. Related to the use as a seasonal power supply, the battery power plant 101 may offer long-term battery energy storage that enables power management responsive to seasonal usage patterns. The battery power plant 101 may additionally or alternatively be used with non-seasonal variables.

As another potential benefit, the battery power plant 101 may mitigate reliance on conventional sources of electricity generation. Seasonal declines in renewable energy supplies generated by the renewable energy source 103 may be offset by the battery power plant 101. The battery power plant 101 may be used for a sustained period during low or no renewable energy supply. For example, solar power from the renewable energy source 103 may be used primarily during the summer to provide power to the grid 102, and the battery power plant 101 may be primarily used during winter months to provide power to the grid 102.

As a related potential benefit, the battery power plant 101 may effectively increase the renewable energy production ratings of the renewable power source 103. Without a bulk energy storage solution, a renewable power source 103 may be granted a power rating based on expected power and coverage capabilities. Seasonal declines and/or unpredictability of the renewable power source 103 conventionally result in lower ratings meaning renewable energy sources are relied upon less. However, the battery power plant 101 may normalize the power ratings of the renewable energy source 103 such that the renewable energy source 103 may operate with power ratings closer to peak power capabilities.

As another potential benefit, the battery power plant 101 may use a modular design, which may function to enable the battery power plant 101 to scale for different use-cases.

As yet another potential benefit, the battery power plant 101 may function to transform renewable energy into a material good in the form of primary battery units 110 that may be shipped and transported.

Figure 2:
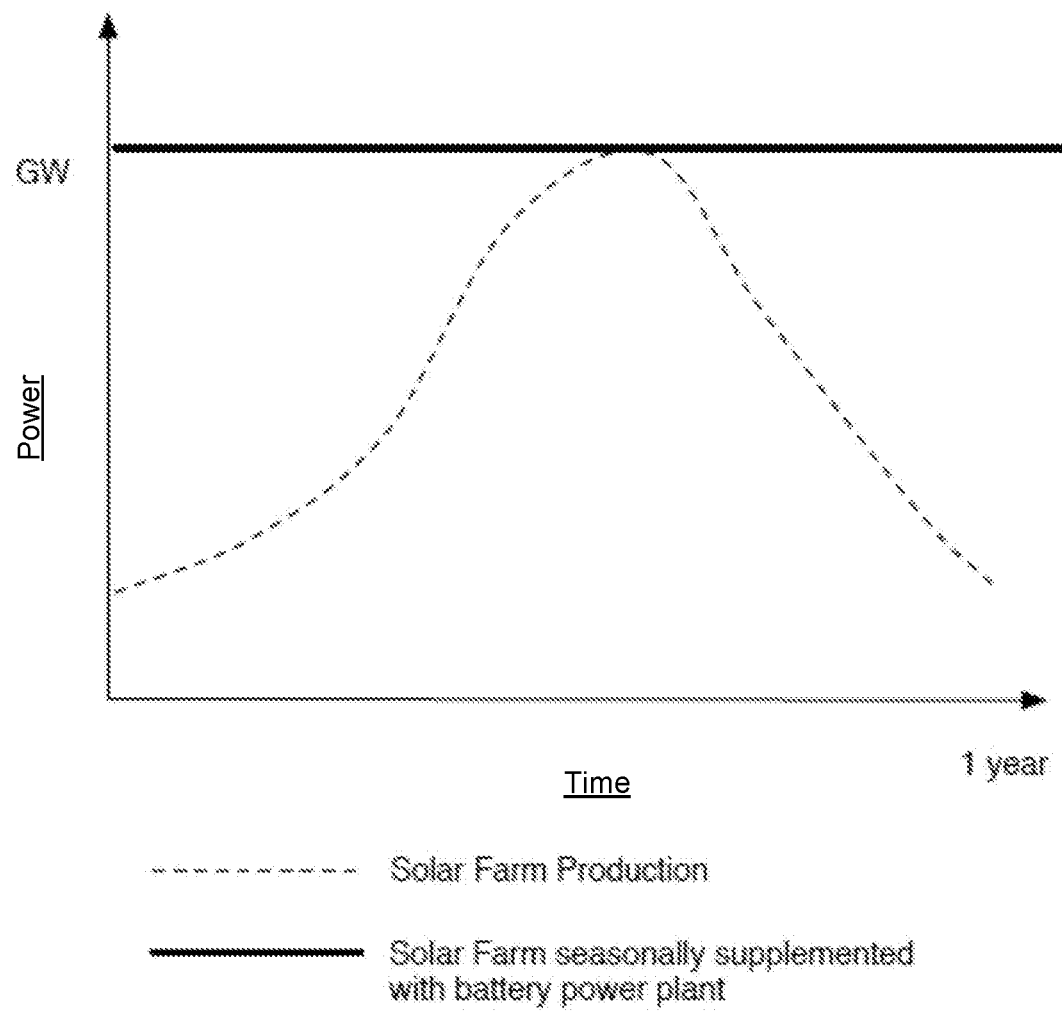
FIG. 2 is a graph of an exemplary impact of embodiment systems and methods on energy production by a solar farm.

Herein, the various embodiments are primarily discussed as they may be applied in combination with renewable energy. In solar energy production, the battery power plants of the various embodiments, such as battery power plant 101, may be used in supplementing solar energy production during the winter months. FIG. 2 is a graph of power output over time of an embodiment system including a battery power plant, such as battery power plant 101, connected to a renewable energy source, such as renewable energy source 103, wherein the renewable energy source is a solar farm. As shown in FIG. 2, the actual solar farm power production indicated by the dashed line may vary seasonally over the course of a year, but the supplemental power provided by the battery power plant during the lower solar power production times may enable the total power output of the embodiment system to remain constant over the course of the year as indicated by the solid line. Hydroelectric power systems that rely on the melting of snowcaps may have similar seasonal patterns to solar systems, and the battery power plants may similarly supplement hydroelectric power systems to offset season patterns.

Figure 3:
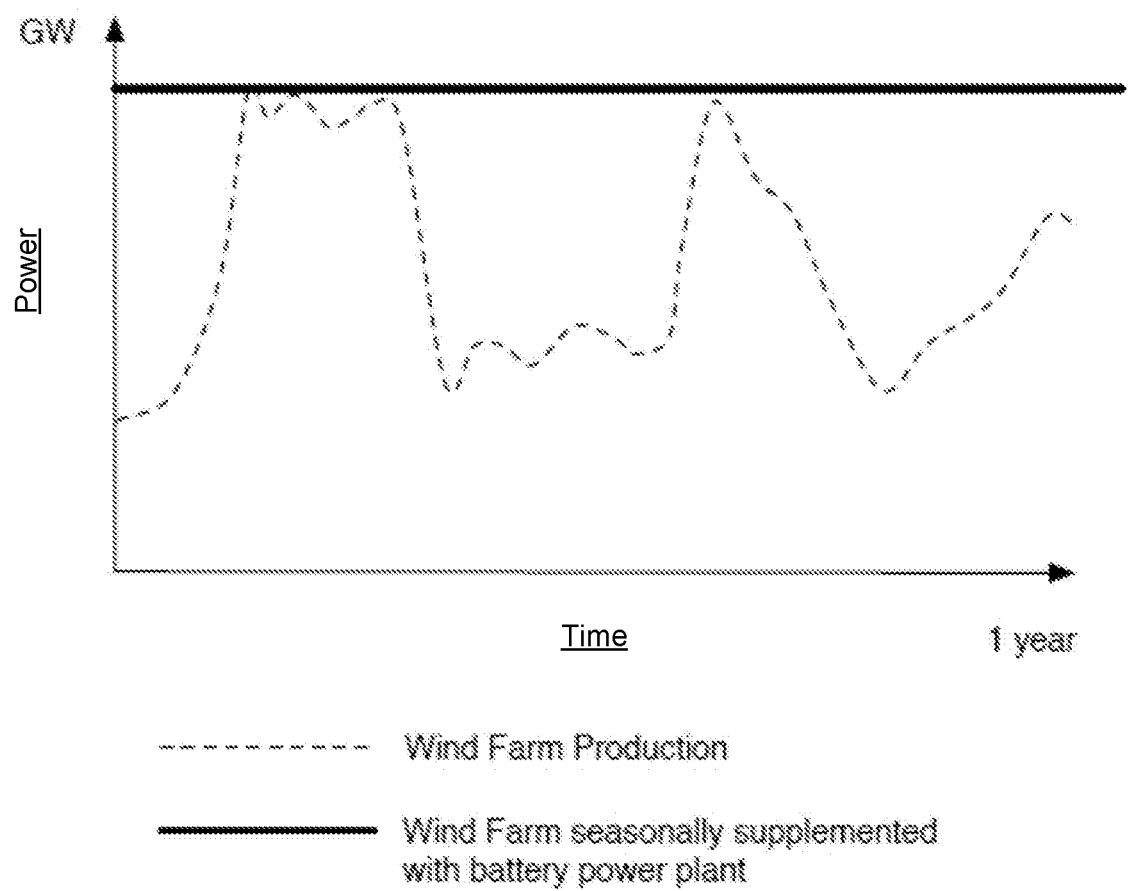
FIG. 3 is a graph of an exemplary impact of embodiment systems and methods on energy production by a wind farm.

In wind energy production, the various embodiment battery power plants, such as battery power plant 101, may be used on demand to account for seasonal and short-term variability in wind energy production. FIG. 3 is a graph of power output over time of an embodiment system including a battery power plant, such as battery power plant 101, connected to a renewable energy source, such as renewable energy source 103, wherein the renewable energy source is a wind farm. As shown in FIG. 3, the actual wind farm power production indicated by the dashed line may vary seasonally and due to short-term wind changes over the course of a year, but the supplemental power provided by the battery power plant during the lower wind power production times may enable the total power output of the embodiment system to remain constant over the course of the year as indicated by the solid line.

The various embodiments may also be applied to other type renewable and/or conventional power sources. For example, the battery power plants of the various embodiments, such as battery power plant 101, may facilitate transitions between energy sources as a region decommissions a power plant and/or onboards a new power plant. The battery power plants of the various embodiments, such as battery power plant 101, may similarly be used off-grid as a secondary power option for a site or even as the primary power option.

Figure 4:
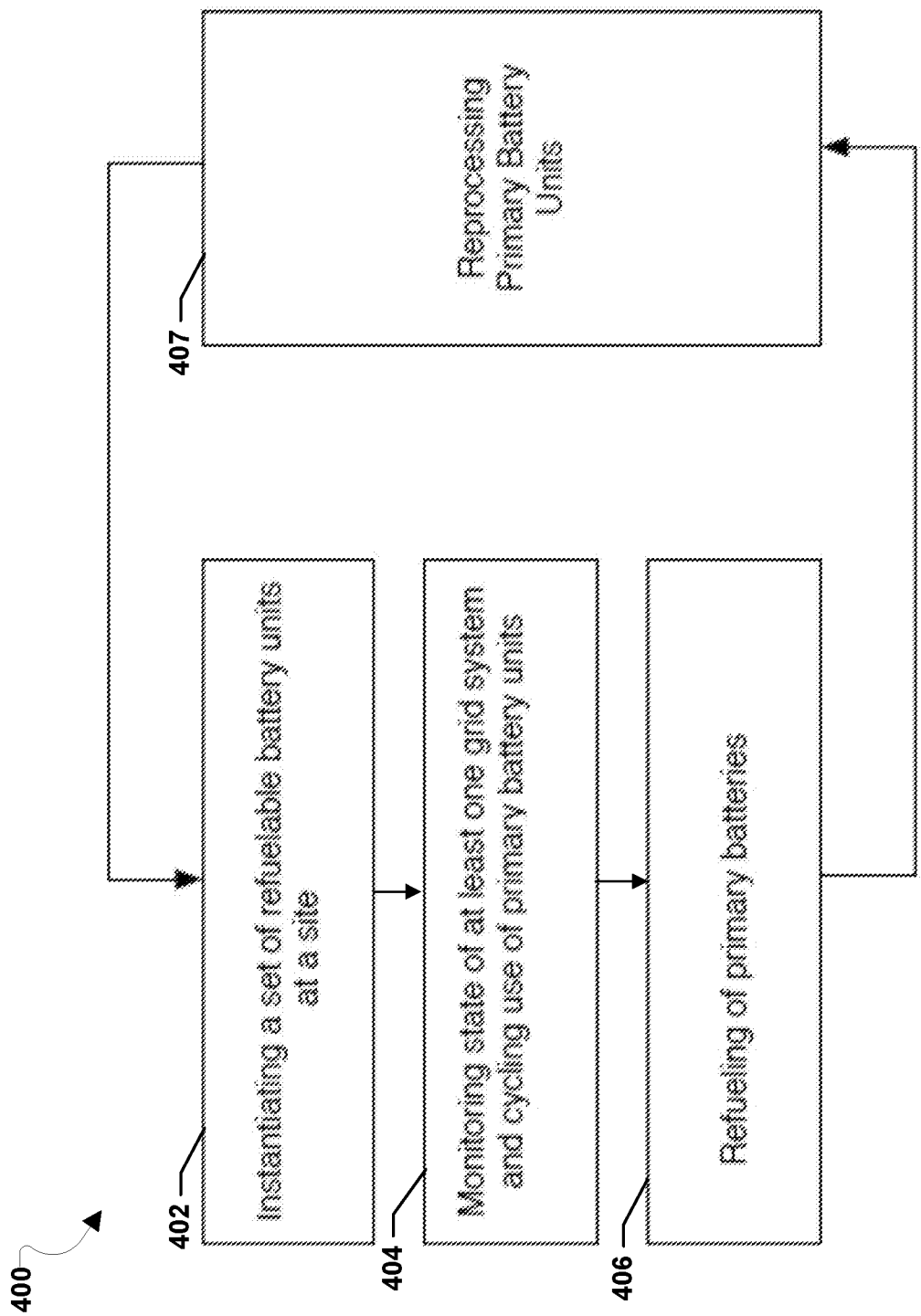
FIG. 4 is a process flow diagram illustrating an embodiment method for refueling and reprocessing primary battery units.

FIG. 4 is a process flow diagram illustrating an embodiment method 400 for operating a refuelable battery power system and specifically for refueling and reprocessing primary batteries. The operations of method 400 may be performed using one or more components of the embodiment refuelable battery power systems described herein, such as refuelable battery power grid system 100. The method 400 may include instantiating a set of refuelable battery units at a site in step 402, monitoring a state of at least one power system, such as at least one grid system, and cycling use of primary battery units in step 404, refueling the primary battery units in step 406, and reprocessing the primary battery units in step 407.

Step 402, which may include instantiating a set of refuelable battery units at a site, functions to setup a number of primary battery power sources for long-term storage to supply energy at a site. Instantiating the refuelable battery units may include delivering the set of refuelable battery units and installing them in a battery power plant that interfaces with a grid or other power consuming/delivery system.

Step 404, which includes monitoring a state of at least one power system, such as at least one grid system, and cycling use of primary battery units, functions to manage the set of primary battery units so as to supplement another power supply. The primary battery units may be reserved to supplement a renewable power source over a long duration such as over one or more weeks, one or more months, a year, or multiple years. The primary battery units may be activated and used until depleted. When they are depleted or nearing end of their useful life, the primary battery units may be identified as needing "refueling". During the next refueling process the primary battery units in need of refueling may be removed or otherwise refueled.

Step 406, which includes refueling the primary batteries, functions to reprocess and/or replace the primary batteries used in the primary battery units. In a first variation, the battery components of primary battery units can be reprocessed in step 407. Material reprocessing can involve transport to a reprocessing site, reprocessing, transporting back to the site of the battery power plant, and reinstalling into the battery power plant in step 402. In some variations, the offsite location is in a region that has more access to renewable energy during the refueling periods. In this way renewable energy can be applied in the manufacturing processing of the battery fuel.

In another variation, the battery components of the primary battery units can be exchanged with new materials. Thus, the primary battery units themselves may only be installed once, but the materials within the primary battery units may be removed, reprocessed, and replaced to refuel the primary battery units. The primary battery units can be kept in place with battery materials exchanged. Such reprocessing operations may be particularly feasible with the seasonal patterns of renewable energy. For example, a battery power plant, such as battery power plant 101, may be used primarily in winter months and then refueled during over the summer months in time for winter.

Figure 5:
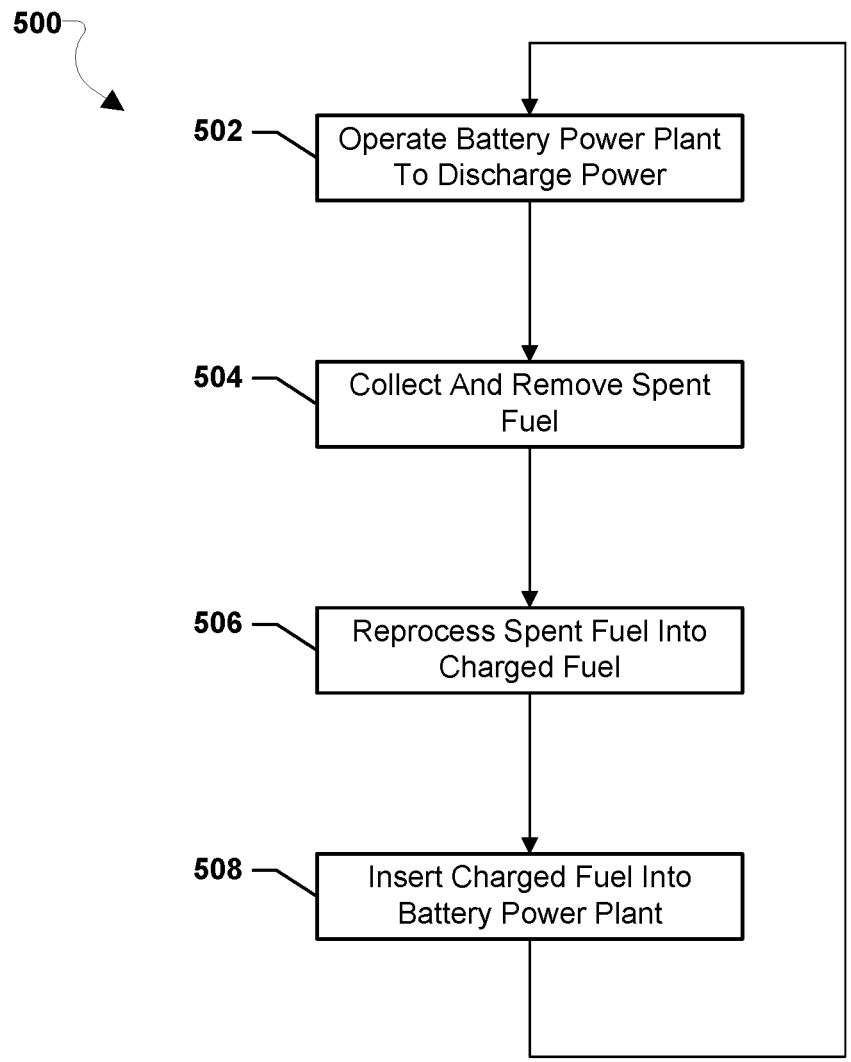
FIG. 5 is a process flow diagram illustrating another embodiment method for refueling primary battery units.

FIG. 5 is a process flow diagram illustrating an embodiment method 500 for refueling materials within primary battery units, such as primary units 110 of refuelable battery power grid system 100. The operations of method 500 may be performed using one or more components of the embodiment refuelable battery power grid systems described herein, such as refuelable battery power grid system 100. In various embodiments, the operations of method 500 may be performed in conjunction with one or more of the operations of method 400 (FIG. 4).

In step 502, the battery power plant, such as battery power plant 101, may be operated to discharge power. To discharge power one or more primary battery units, such as one or more primary battery units 110, of the battery power plant, such as battery power plant 101, may be operated in a discharge mode. For example, the primary battery units 110 may be operated in a discharge mode to generate and provide supplemental power to the grid 102 to offset drops in power generation by renewable energy source 103. The primary battery units 110 may be operated in the discharge mode to generate and provide supplemental power to the grid 102 and renewable energy source 103 over a long duration such as over one or more weeks, one or more months, a year, and/or multiple years. The discharge of power from the battery power plant, such as battery power plant 101 may occur for a timeframe that is seasonal, such as for a timeframe of one or more weeks, months, seasons, and/or years. Such seasonal timeframe discharges from the battery power plant, such as battery power plant 101, may be longer in duration than hourly or daily discharges and may offset seasonal reductions in the ability of renewable energy sources, such as renewable energy source 103, to generate power.

In step 504, the spent fuel from the primary battery units, such as primary battery units 110, may be collected and removed. In various embodiments, as the primary battery units 110 are operated in a discharge mode to generate power, anode material (i.e., charged fuel) of the primary battery unit 110 may oxidize and the oxidized anode material (i.e., the spent fuel) may be collected and removed for reprocessing. In a similar manner, in various embodiments, as the primary battery units 110 are operated in a discharge mode to generate power, cathode material (i.e., charged fuel) of the primary battery unit 110 may be reduced and the reduced cathode material (i.e., the spent fuel) may be collected and removed for reprocessing. In some embodiments, the charged fuel may oxidize in place and the fuel material may be removed directly from its support within the primary battery unit 110. For example, in an electrolyte solution with a pH greater than 6, an iron anode may oxidize in place to form an oxidized anode material, such as oxidized anode particulate, oxidized anode powder, oxidized anode shards, etc., of $Fe(OH)_2$, $Fe(OH)_3$, $Fe_2O_3$, $Fe_3O_4$, FeOOH, or combinations thereof. In some embodiments, the charged fuel may oxidize and circulate into the electrolyte where it may be filtered out for removal. For example, in a high pH electrolyte solution (e.g., with a pH greater than 6) an iron anode may form an oxidized anode material, such as oxidized anode particulate, oxidized anode powder, oxidized anode shards, etc., of $Fe(OH)_2$, $Fe(OH)_3$, $Fe_2O_3$, $Fe_3O_4$, FeOOH, or combinations thereof in the electrolyte and the electrolyte may be filtered (such as in a filter area) to trap and remove the oxidized anode material. In some embodiments, the filter area may include a foam, such as a seeded foam, to trap the oxidized anode material as the electrolyte circulates through the filter area. The foam may be seeded with a metal hydroxide (OH), such as calcium hydroxide (CaOH). In some embodiments, the filter area may be a bag or other type container, removable from the primary battery unit 110 in which oxidized anode material, such as oxidized anode particulate, oxidized anode powder, oxidized anode shards, etc., may be collected. In various embodiments in which cathode material is to be removed, a filter area may trap and remove reduced cathode material in similar manners as discussed above. In various embodiments, electrolyte levels in the primary battery units 110 may be raised and/or lowered to facilitate collection and removal of spent fuel. As examples, pumps, valves, and other partitions of the primary battery units 110 may be used to fluidically isolate portions of the primary battery units 110 to enable the electrolyte levels in the primary battery units 110 to be raised and/or lowered to facilitate collection and removal of spent fuel.

In step 506, the spent fuel may be reprocessed into charged fuel. For example, the spent fuel may be reprocessed into charged fuel at the reprocessing site 104. In embodiments in which the primary battery units 110 may utilize iron based anodes that need restocking/reenergizing, oxidized anode material (i.e., spent fuel) from the primary battery units 110 may be reprocessed into new anode material (i.e., charged fuel) by reduction (e.g., DRI processing, HBI processing, etc.), smelting, electrolysis, or any other reprocessing operation (e.g., any metallurgical process that restocks/reenergizes anode material). In some embodiments, additives may be added to the spent fuel during reprocessing. For example, carbon (e.g., graphite) may be added to the spent fuel during reprocessing. This additional carbon may help with reduction of the spent fuel into charged fuel. Alternatively, carbon (e.g., graphite) may be added to the anode during the anode manufacturing. This additional carbon may increase conductivity of the anode during the battery operation and help with reduction of the spent fuel (i.e., oxidized anode material) into charged fuel during the reduction process via a carbothermal reduction process at the reprocessing site 104. In some embodiments, the reprocessing may include carbon based thermal reduction using natural gas or coal burning furnaces which may add carbon to the charged fuel. In some embodiments, the spent fuel reprocessing of step 506 may include reprocessing spent cathode material into recharged cathode material.

In some embodiments, the energy used for reprocessing the spent fuel into charged fuel may come from renewable energy sources, such as renewable energy source 103 or another renewable energy source. For example, when reprocessing site 104 and renewable energy source 103 are co-located, the renewable energy source 103 may provide the power for the reprocessing operations of reprocessing site 104, such as when the renewable energy source 103 has excess power available (e.g., during summer months for solar farms, high wind periods for wind farms, spring thaws for hydroelectric dams, etc.). In this manner, during seasonal periods of high renewable energy output, a portion of the excess renewable energy may be used for fuel reprocessing.

In step 508, the charged fuel may be inserted into the battery power plant. For example, new anode material formed from reprocessing the spent fuel into charged fuel in step 506 may be placed onto anode supports of the primary battery units 110 in step 508 to thereby refuel the primary battery units 110. As another example, new cathode material formed from reprocessing the spent fuel into charged fuel in step 506 may be placed onto cathode supports of the primary battery units 110 in step 508 to thereby refuel the primary battery units 110. The charged fuel (e.g., a Fe anode, etc.) may be placed into a battery chamber of the primary battery unit through an opening in the battery chamber (e.g., an access port) and onto a support, such as an anode support, cathode support, etc. With the new charged anode and/or cathode the primary battery unit 110 may be refueled and the method may proceed to step 502 to operate the primary battery unit 110 in discharge mode as needed.

In various embodiments, the primary battery units, such as primary battery units 110, may be air-breathing batteries and the refueling of the primary battery units in step 504 may include collection and removal of anode material and the charged fuel inserted in step 508 may be new anode material. In various embodiments, the refueling of the primary battery units in step 504 may include collection and removal of cathode material and the charged fuel inserted in step 508 may be new cathode material. In some embodiments, the primary battery units, such as primary battery units 110, may be non-air-breathing batteries having two different materials used as electrodes, such as one metal oxide, such as an ore or mineral, for the cathode and one metal for the anode. One of the electrodes may be recharge/renewed after discharge and the other electrode may be removed and sold or otherwise consumed as an electrorefined metal. That removed and sold or otherwise consumed electrode may be partially or entirely replaced with a new electrode. For example, one metal may be in the oxidized state and the other metal in the reduced state (e.g., $Fe_2O_3$ and Al). The primary battery unit may be operated in a discharge mode and one of the two metals of the cathode and/or anode may be processed into an electrorefined metal during discharge that may have value. For example, the couple including $Fe_2O_3$ and Al would produce iron (Fe) metal and aluminum oxide ($Al_2O_3$). The electrorefined metal may be removed from the primary battery unit and sold or otherwise consumed. That electrode that resulted in the electrorefined metal (e.g., the original cathode or original anode) may be replaced with an entirely new electrode. The other metal may reduce or oxidize into an expended electrode material (e.g., reduced cathode material or oxidized anode material). The expended electrode material (e.g., reduced cathode material or oxidized anode material) may be processed into a recharge electrode material (e.g., recharge cathode material or recharge anode material) and replaced back into the battery to refuel the primary battery unit. In this manner, while both electrodes may be replaced, only one of the two electrodes may be processed into new fuel for the primary battery unit.

Figure 6:
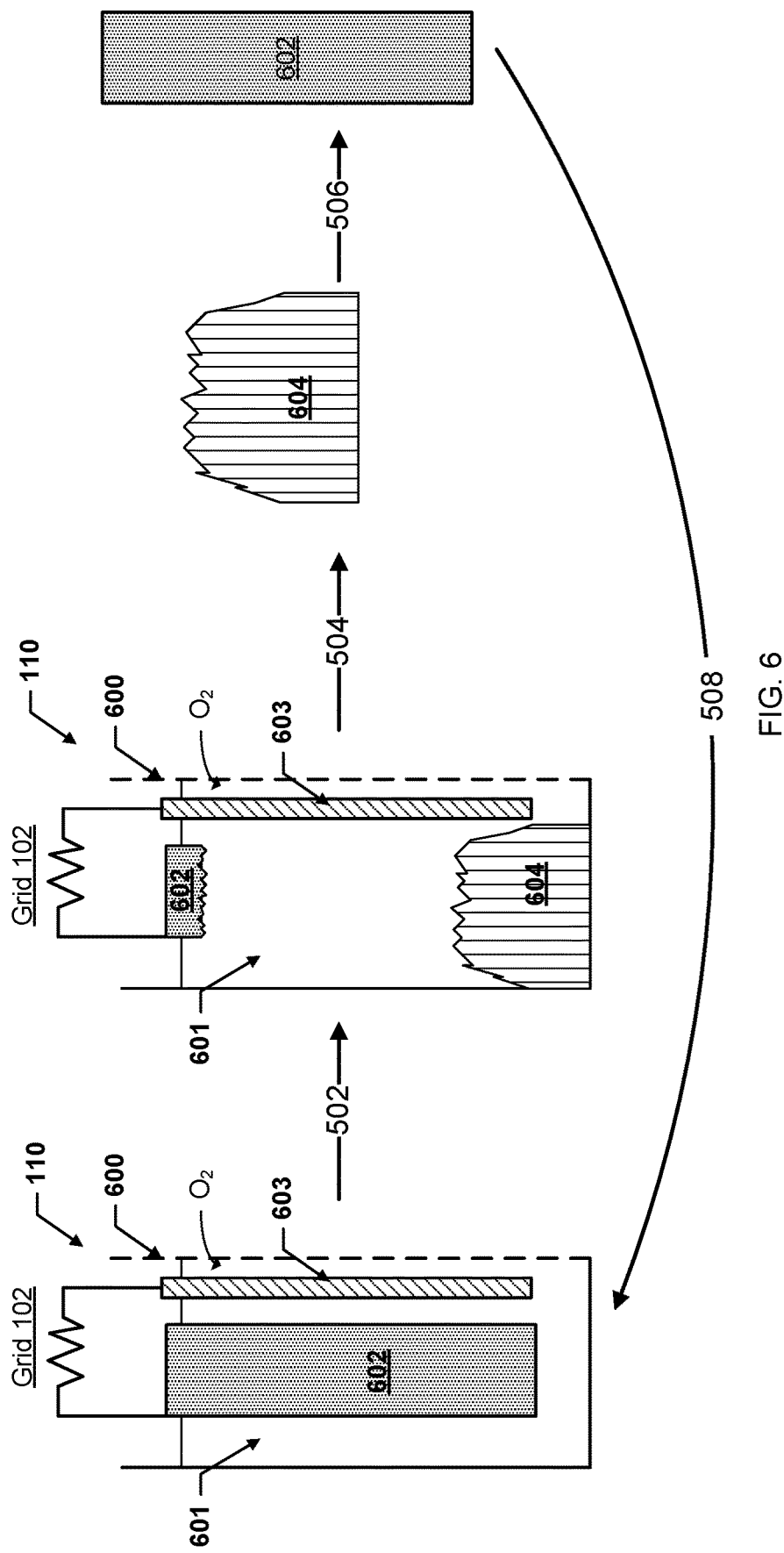
FIG. 6 is a block diagram illustrating the operation of components of an embodiment refuelable battery power grid system according to the embodiment method illustrated in FIG. 5.

FIG. 6 is a block diagram illustrating the operation of components of an embodiment refuelable battery power grid system, such as refuelable battery power grid system 100, operated according to the embodiment method 500 illustrated in FIG. 5. FIG. 6 illustrates a single battery unit 110, such as primary or secondary battery unit. For example, the primary battery unit 110 may be an iron-air (Fe-air) battery that is mechanically refuelable. Alternatively, the primary battery unit 110 may be a battery with an anode including iron (Fe), zinc (Zn), magnesium (Mg), aluminum (Al), or an alloy formed substantially of one or more of iron, zinc, magnesium and/or aluminum. The primary battery unit 110 may be a battery with an anode including iron (Fe) or an iron alloy. The primary battery unit 110 may be a battery with an anode including zinc (Zn) or a zinc alloy. The primary battery unit 110 may be a battery with an anode including magnesium (Mg) or a magnesium alloy. The primary battery unit 110 may be a battery with an anode including aluminum (Al) or an aluminum alloy. The primary battery unit 110 may be a non-air-breathing battery. The primary battery unit 110 may include a battery chamber 600 supporting the anode 602 and at least one cathode 603 in an electrolyte 601. The anode 602 may be an anode material disposed on an anode support, such as a bed, mesh, foil, or other scaffold, within the battery chamber 600. The anode 602 may include iron(Fe), zinc (Zn), magnesium (Mg), aluminum (Al), and/or an alloy formed substantially of one or more of iron, zinc, magnesium and/or aluminum. In certain embodiments, the anode 602 may be a monolithic anode, including only a single phase of matter. For example, the anode 602 may be a block, plate, sheet, or foil of metal and the anode 602 may be dense or porous. In certain embodiments it may be advantageous for the anode 602 to be porous to allow liquid electrolyte to infiltrate the anode 602 to increase the surface area of contact between the metal anode 602 and liquid electrolyte 601 and to promote rapid ion transport through the anode 602. In certain other embodiments, it may be advantageous to have a dense metal electrode to minimize the volume of the anode 602. In certain other embodiments, the anode 602 may be comprised of multiple phases of matter, such as a metal powder and an inert (i.e. non-reactive) material such as carbon or a polymeric binder. The addition of an inert material may improve the electrochemical and/or mechanical properties of the anode 602. For example, the anode material in the anode 602 may be powdered Fe and a binder material, wherein the binder is added to improve the mechanical integrity of the electrode. In certain other embodiments, the anode material in the anode 602 may be powdered Fe and a carbon material, wherein the carbon is added to improve the electrical conductivity of the electrode. In certain other embodiments, the anode material in the anode 602 may be powdered Fe, a binder material, and carbon, where the anode 602 enjoys the benefits of both improved mechanical integrity from the binder and improved electrical conductivity from the carbon.

The cathode 603 may be a gas diffusion electrode to enable reactions which have a combination of liquid and gaseous reactants and products. The cathode 603 may be formed from a porous support material (alternatively called a scaffold or substrate) which may be optionally decorated with a catalyst to improve the interfacial reaction kinetics. The cathode 603 may be formed from various materials, such as carbon (C), nickel (Ni), or titanium (Ti), or nickel-iron alloys (NiFe). The cathode 603 may be optionally decorated with a catalyst known to promote the desired discharge reaction.

The primary battery unit 110 may receive air into the battery chamber 600 via one or more air inlets in the battery chamber 600. The air inlets may act as oxygen inlets providing air including oxygen ($O_2$) into the battery chamber 600. In some embodiments, the primary battery unit 110 may receive oxygen ($O_2$) into the battery chamber 600 via one or more oxygen inlets in the battery chamber 600.

The electrolyte 601 may be an alkaline solution comprised of water as a solvent and one or more dissolved hydroxides, such as lithium hydroxide (LiOH), sodium hydroxide (NaOH), potassium hydroxide (KOH), or ammonium hydroxide ($NH_4OH$). The electrolyte 601 may optionally contain additives to promote or inhibit certain desired or undesirable reactions. For example, the electrolyte 601 may contain hydrogen evolution reaction inhibitor (e.g., Sn $(OH)_6^{2-}$) and/or a Fe activator (such as a sulfide salt such as bismuth sulfide ($Bi_2S_3$) or sodium sulfide ($Na_2S$)). In a discharging mode, the primary battery unit 110 may generate power and an oxygen reduction reaction (ORR) may occur on the cathode 603. In various embodiments, the primary battery unit 110 is not configured to operate in a charging mode (or recharging mode).

As discussed above, in step 502 of method 500 the battery unit 110 may be operated in a discharge mode to generate power output to the grid 102 or any other system or device receiving power. In the discharge mode, the anode 602 may oxidize and oxidized anode material 604, such as oxidized anode particulate, oxidized anode powder, oxidized anode shards, etc., may be generated in the battery chamber 600. While illustrated as having the oxidized anode material 604 falling through the electrolyte 601, the anode 602 may oxidize in place. The oxidized anode material 604 may include $Fe(OH)_2$, $Fe(OH)_3$, $Fe_2O_3$, $Fe_3O_4$, FeOOH, or combinations thereof when the electrolyte has a pH of greater than 6.

As discussed above, in step 504, the oxidized anode material 604 may be collected and removed from the battery chamber 600. Filters, pumps, valves, and access ports may be used in various embodiments to collect and remove the oxidized anode material 604. As discussed above, in step 506, the oxidized anode material 604 may be reprocessed into charged fuel (i.e., anode material 602). The metallurgical processing applied to the oxidized anode material 604 may reconstitute the anode 602 which may be replaced in the battery unit 110 in step 508 as discussed above.

While FIG. 6 is illustrated and discussed in relation to oxidized anode material 604, such as oxidized anode particulate, oxidized anode powder, oxidized anode shards, etc., being collected and removed, being reprocessed into charged fuel, and being replaced in the battery unit 110, the discussion of oxidized anode material 604 is merely for illustration purposes. Reduced cathode material may be substituted in the various examples for the oxidized anode material 604 and reduced cathode material may be collected and removed, reprocessed into charged fuel, and replaced in the battery unit 110 in a similar manner as discussed above.

Figure 7:
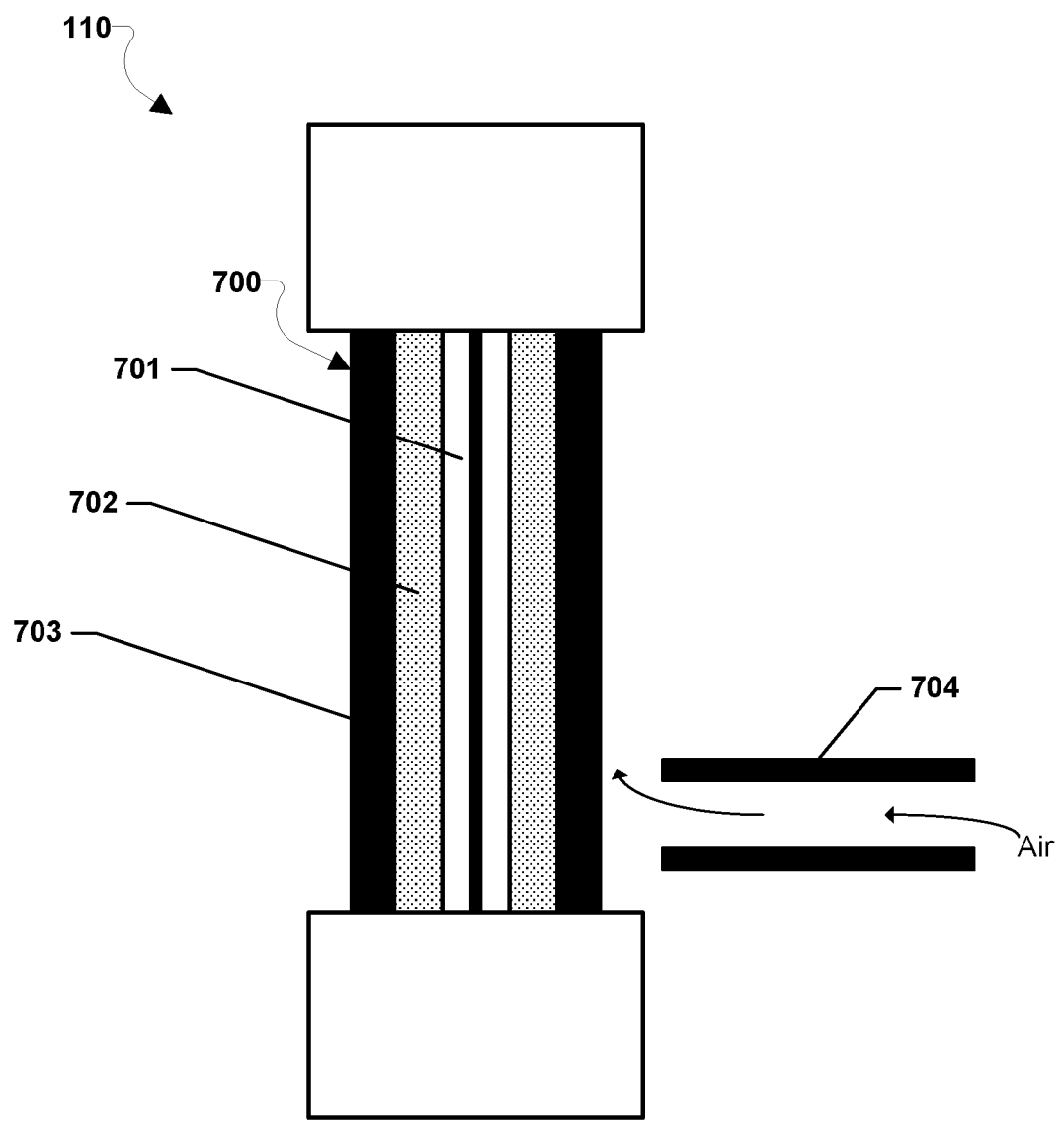
FIG. 7 is a block diagram of an embodiment refuelable battery.

FIG. 7 illustrates an embodiment configuration of refuelable battery that may be used as a primary battery unit 110 in various embodiments. The refuelable battery illustrated in FIG. 7 may operate in a similar manner to the refuelable battery discussed above with reference to FIG. 6. The refuelable battery illustrated in FIG. 7 may be a Fe-air type battery including a battery chamber 700 supporting an anode 701 of powdered Fe and a binder. Additionally, the anode 701 may include a concentration of carbon (C), such as at a volume per volume percent (v/v%) concentration of 2 v/v%, which may be added before, during, or after reduction of the anode 701 and which may aid in reduction and increase conductivity of the anode 701. The anode 701 may be a packed bed of Fe powder and the binder. As an example, the anode 701 may have previously been reprocessed under hydrogen ($H_2$) at 800 degrees Celsius using DRI processing. A porous separator 702 may support the electrolyte, such as potassium and/or sodium hydroxide (e.g., (K/Na(OH)). The outer wall of the battery chamber 700 may be formed of a porous gas diffusion electrode 703 that may operate as a cathode. The gas diffusion electrode 703 may operate as an air inlet, such as an oxygen inlet, to provide air, such as air including oxygen, oxygen, etc., into the battery chamber 700. A carbon dioxide ($CO_2$) scrubber 704 may be coupled to the air inlet, such as the oxygen inlet, to remove $CO_2$ from air provided to the battery chamber 700. The $CO_2$ scrubber 704 may be any type $CO_2$ scrubber, such as a selective membrane or other $CO_2$ removing device. In certain other embodiments, the $CO_2$ scrubber 704 may be a reactive pebble bed loaded with powdered NaOH which reacts with $CO_2$ to form $Na_2CO_3$. The $CO_2$ scrubber 702 may be either regenerable or not. The anode 701 may be removable and replaceable to refuel the primary battery unit 110. The refuelable battery illustrated in FIG. 7 may be expected to achieve a 1.1 kWHr/kg Fe based on a geometry of 10 $mA/cm^2$ and expected polarization behaviors. Additionally, the porous gas diffusion electrode 703 may be removable and replaceable to refuel the primary battery unit 110.

Figure 8:
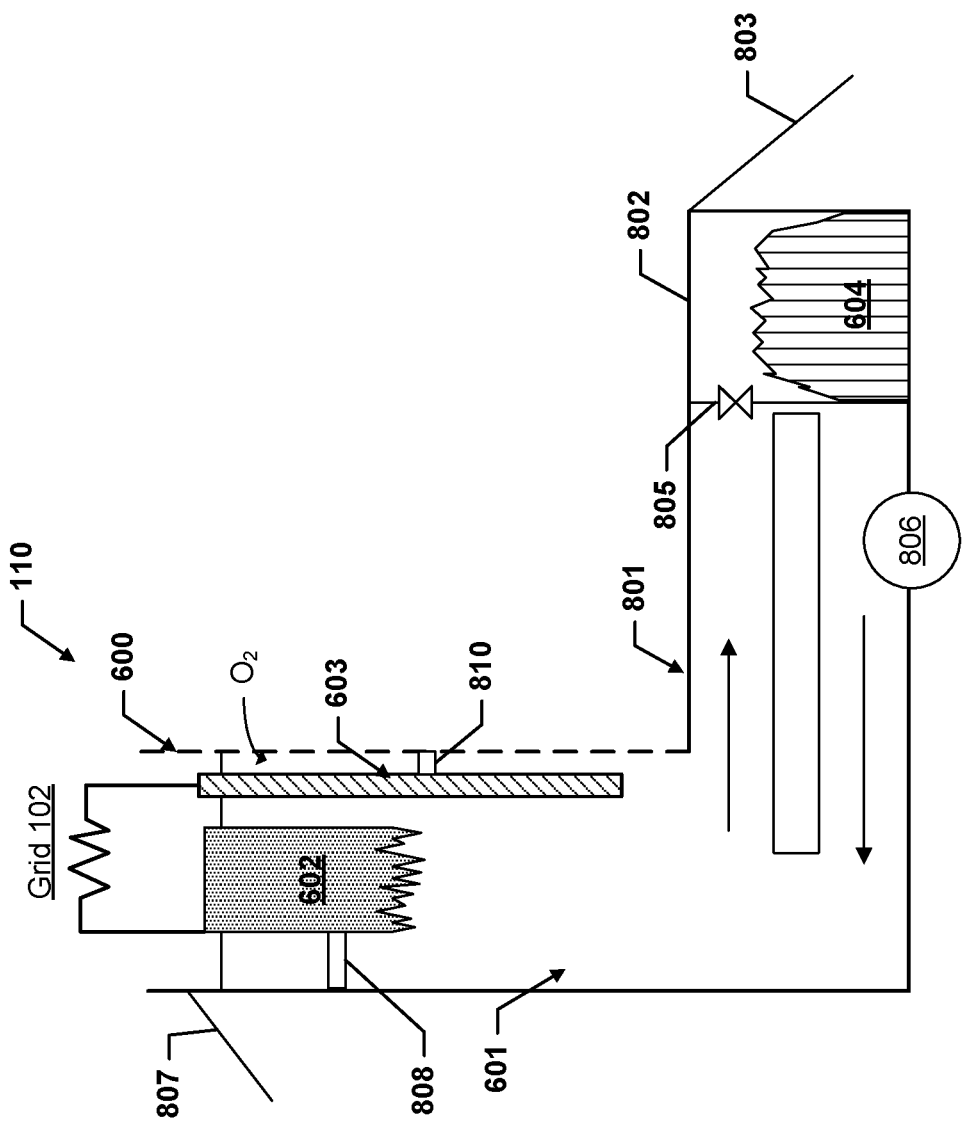
FIG. 8 is a block diagram of another embodiment refuelable battery.

FIG. 8 is a block diagram of another embodiment refuelable battery that may be used as a primary battery unit 110 in various embodiments. The refuelable battery illustrated in FIG. 8 may operate in a similar manner to the refuelable batteries discussed above with reference to FIGS. 6 and 7. Refuelable battery illustrated in FIG. 8 may include a recirculation system 801 and a filter area 802 as part of the battery chamber 600. The recirculation system 801 may be configured to circulate electrolyte 601 past the anode 602 and cathode 603 and through the filter area 802. For example, the recirculation system 801 may include a circulation pump 806 configured to circulate electrolyte through the filter area 802 and the rest of the battery chamber 600. As discussed above, the anode 602 may be an iron or iron alloy anode. The anode 602 may include iron, zinc, aluminum, and/or magnesium. The anode 602 may be a zinc (Zn), magnesium (Mg), or aluminum (Al), anode.

The anode 602 may include iron (Fe), zinc (Zn), magnesium (Mg), aluminum (Al), and/or an alloy formed substantially of one or more of iron, zinc, magnesium and/or aluminum. The anode 602 may include iron (Fe) or an iron alloy. The anode 602 may include zinc (Zn) or a zinc alloy. The anode 602 may include magnesium (Mg) or a magnesium alloy. The anode 602 may include aluminum (Al) or an aluminum alloy. As discussed above, the anode 602 may oxidize to form solid phase reaction products which may be dispersed or suspended in the electrolyte 601. The electrolyte 601 passes through the recirculation system 801 to the filter area 802 and the oxidized anode material 604 is filtered out of the electrolyte 601 and trapped in the filter area 802. The filter area 802 may include a filter element, such as a foam, to act as a trap for the oxidized anode material 604. The foam may be seeded, such as with a metal hydroxide (e.g., calcium hydroxide (CaOH), etc.) to facilitate trapping of the oxidized anode material 604. The electrolyte 601 may have a high pH value, such as greater than 6. The filter area 802 may be a compartment, such as a bag, box, trap, or other type compartment that may be fluidically separated from the battery chamber 600 by closing a valve 805. The filter area 802 may then be drained of electrolyte 601. The oxidized anode material 604 may be removed for reprocessing by opening access port 803 providing access to the filter area 802. Once the oxidized anode material 604 is removed, the access port 803 may be closed, the valve 805 may be opened, and electrolyte 601 may once again be filtered through the filter area 802 to trap oxidized anode material 604. Another access port 807 may facilitate the insertion of a recharged anode 602 into the battery chamber 600. The access port 807 may be configured to allow charged anode material (e.g., solid Fe) to be placed on an anode support 808 of the battery chamber 600 that suspends the anode 602 in the battery chamber 600. The refuelable battery illustrated in FIG. 8 may achieve a 1.3 kWhr/kg Fe for 3e⁻ discharge at 1.0V. The refuelable battery illustrated in FIG. 8 may have a high impurity tolerance.

While FIG. 8 is illustrated and discussed in relation to oxidized anode material 604 being trapped in the filter area 802, being reprocessed into charged fuel, and being replaced in the battery chamber 600, the discussion of oxidized anode material 604 is merely for illustration purposes. Reduced cathode material may be substituted in the various examples for the oxidized anode material 604 and reduced cathode material may be trapped in the filter area 802, reprocessed into charged fuel, and replaced in the battery chamber 600 in a similar manner as discussed above. For example, the access port 807 may be configured to allow charged cathode material to be placed on a cathode support 810 of the battery chamber 600 that suspends the cathode 603 in the battery chamber 600.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A refuelable battery, comprising:
   a battery chamber comprising:
   an electrode support configured to support an electrode material within the battery chamber;
   a first access port configured to allow placement of reprocessed electrode material within the battery chamber and on the electrode support;
   a second access port;
   a filter area accessible by the second access port; and
   a circulation pump configured to circulate the electrolyte through the filter area,
   wherein the filter area is configured to trap expended electrode material generated from the electrode material while the refuelable battery is operating in a discharge mode for removal of the expended electrode material from the battery chamber via the second access port,
   wherein the filter area is fluidically isolated from a portion of the battery chamber such that the electrolyte does not circulate into or out of the filter area from the portion during the removal of the expended electrode material, and
   wherein the reprocessed electrode material is generated from the expended electrode material.

2. The refuelable battery of claim 1, wherein:

the electrode support is an anode support;

the electrode material is an anode material; and the expended electrode material is oxidized anode material generated from the anode material while the refuelable battery is operating in the discharge mode.

3. The refuelable battery of claim 2, further comprising:

an anode supported on the anode support;

an air inlet in the battery chamber configured to provide air into the battery chamber; and an electrolyte within the battery chamber in contact with the anode.

4. The refuelable battery of claim 3, wherein the anode material comprises at least one of iron, zinc, aluminum, or magnesium.

5. The refuelable battery of claim 3, wherein the anode material comprises an iron alloy.

6. The refuelable battery of claim 5, wherein the iron alloy comprises iron and one or more of zinc, aluminum, magnesium, and carbon.

7. The refuelable battery of claim 3, wherein the anode material comprises a zinc alloy, an aluminum alloy, or a magnesium alloy.

8. The refuelable battery of claim 3, wherein the filter area is configured to trap the oxidized anode material.

9. The refuelable battery of claim 8, wherein the filter area comprises a foam seeded with calcium hydroxide.

10. The refuelable battery of claim 3, further comprising a carbon dioxide scrubber coupled to the air inlet.

11. The refuelable battery of claim 1, wherein:

the electrode support is a cathode support;

the electrode material is a cathode material; and the expended electrode material is reduced cathode material generated from the cathode material while the refuelable battery is operating in the discharge mode.

* * * * *